US008854698B2

(12) United States Patent  
Uchida

(10) Patent No.: US 8,854,698 B2  
(45) Date of Patent: Oct. 7, 2014

(54) IMAGE READING APPARATUS WITH AT LEAST THREE REFERENCE MEMBERS ARRANGED ALONG SUB-SCANNING DIRECTION FOR SHADING CORRECTION

(75) Inventor: Naotaka Uchida, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 157 days.

(21) Appl. No.: 13/481,208

(22) Filed: May 25, 2012

(65) Prior Publication Data

US 2012/0307317 A1 Dec. 6, 2012

(30) Foreign Application Priority Data

May 31, 2011 (JP) ................................. 2011-121316

(51) Int. Cl.
- *H04N 1/40* (2006.01)
- *H04N 1/407* (2006.01)
- *H04N 1/401* (2006.01)
- *G06K 9/40* (2006.01)
- *B41J 2/47* (2006.01)

(52) U.S. Cl.
CPC ............. *H04N 1/4076* (2013.01); *H04N 1/401* (2013.01)
USPC ............. 358/461; 358/448; 358/1.9; 358/3.1; 382/274; 347/234

(58) Field of Classification Search
None
See application file for complete search history.

(56) References Cited

U.S. PATENT DOCUMENTS

| | | | |
|---|---|---|---|
| 5,206,501 A * | 4/1993 | Sakakibara et al. | ....... 250/208.1 |
| 6,144,776 A | 11/2000 | Daidoh et al. | |
| 7,672,019 B2 * | 3/2010 | Misaka | .......................... 358/3.27 |
| 7,894,673 B2 * | 2/2011 | Takemoto | ....................... 382/190 |
| 2007/0285730 A1 * | 12/2007 | Suzuki et al. | ................. 358/3.24 |
| 2010/0232834 A1 | 9/2010 | Ishida | |

FOREIGN PATENT DOCUMENTS

| | | |
|---|---|---|
| JP | 3-268566 | 11/1991 |
| JP | 11-8763 | 1/1999 |
| JP | 3660180 | 6/2005 |
| JP | 2006-237802 | * 9/2006 |
| JP | 2006-262063 | * 9/2006 |
| JP | 2009-296092 | 12/2009 |
| JP | 2010-16514 | 1/2010 |
| JP | 2010-217418 | 9/2010 |
| JP | 2010-220055 | 9/2010 |

OTHER PUBLICATIONS

Notice of Reason for Refusal dated Oct. 2, 2013, directed to Japanese Patent Application No. 2011-121316; 6 pages.

* cited by examiner

*Primary Examiner* — Steven Kau
(74) *Attorney, Agent, or Firm* — Lucas & Mercanti, LLP

(57) ABSTRACT

An image reading apparatus includes a light source device, a reader, a plurality of strip-shaped density reference members, and a shading corrector. The plurality of strip-shaped density reference members that extend along main scanning direction. The plurality of strip-shaped density reference members are separately disposed in at least three positions including an upstream end portion, a center portion, and a downstream end portion in the moving direction of the sub scanning direction within a readable area of the reader. The shading corrector is configured to calculate shading correction data using density distribution data obtained by reading the plurality of strip-shaped density reference members with the reader and correct image data of the printed document on a pixel to pixel basis, based on the shading correction data.

9 Claims, 8 Drawing Sheets

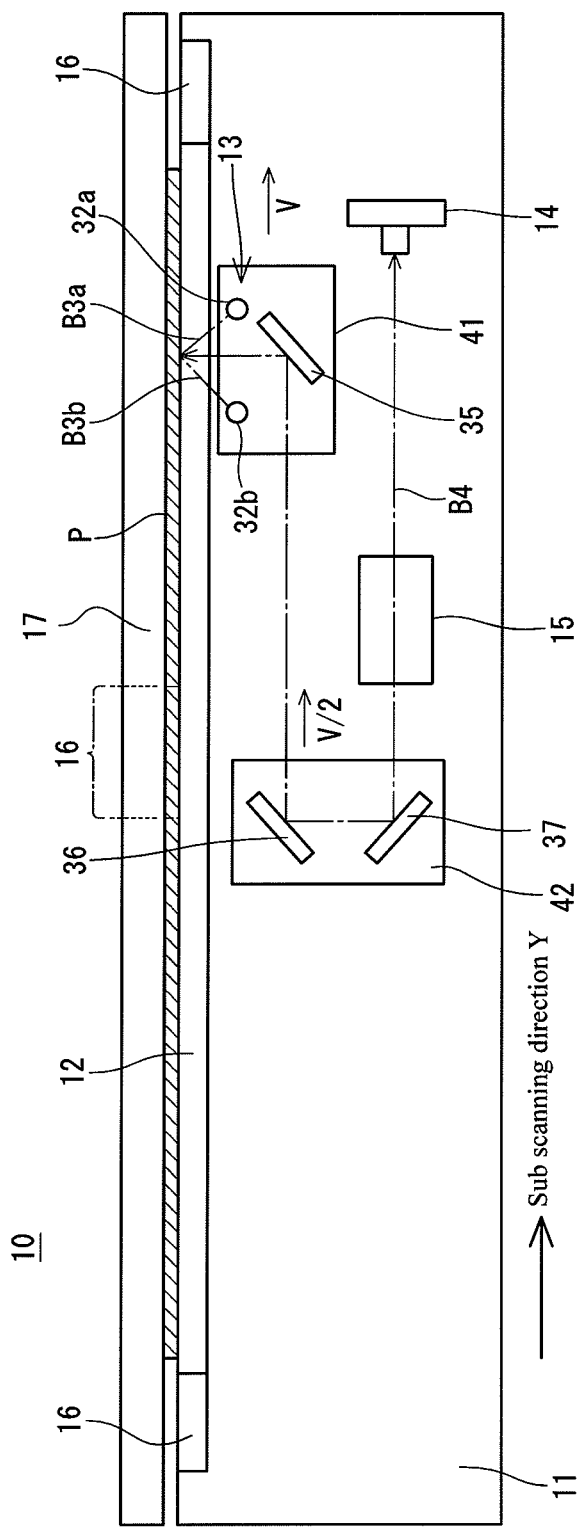

IMAGE READING APPARATUS WITH AT LEAST THREE REFERENCE MEMBERS ARRANGED ALONG SUB-SCANNING DIRECTION FOR SHADING CORRECTION

CROSS-REFERENCE TO RELATED APPLICATIONS

The present application claims priority under 35 U.S.C. §119 to Japanese Patent Application No. 2011-121316, filed May 31, 2011. The contents of this application are incorporated herein by reference in their entirety.

BACKGROUND OF THE INVENTION

1. Field of the Invention

The present invention relates to an image reading apparatus.

2. Discussion of the Background

An electrographic image forming apparatus includes an image reading apparatus using a stationary-document-reading method (a platen-set method). The stationary-document-reading method reads an image of a printed document placed on a platen glass of a document table by exposure and scanning of an optical system. Japanese Patent No. 3660180 and Japanese Unexamined Patent Application Publication No. 2010-220055 disclose what is called a shading correction to correct for density variation (light amount variation) in the main scanning direction caused by characteristics of an optical system. The shading correction is a correction that includes: locating a white reference plate in an upstream, which is outside of a document placing area, of the sub scanning direction; reading a white color on the surface of the white reference plate with an optical system, so as to obtain shading correction data; and correcting image data such that the image data has uniform brightness of a printed document on a pixel to pixel basis, based on the shading correction data.

SUMMARY OF THE INVENTION

According to one aspect of the present invention, an image reading apparatus includes a light source device, a reader, a plurality of strip-shaped density reference members, and a shading corrector. The light source device is configured to move an irradiated region in a sub scanning direction and irradiate a printed document placed on a platen glass of a document table with a light. The reader is configured to convert a light reflected from the printed document into the image data so as to read. The plurality of strip-shaped density reference members that extend along a main scanning direction. The plurality of strip-shaped density reference members are separately disposed in at least three positions including an upstream end portion, a center portion, and a downstream end portion in the moving direction of the sub scanning direction within a readable area of the reader. The shading corrector is configured to calculate shading correction data using density distribution data obtained by reading the plurality of strip-shaped density reference members with the reader and correct image data of the printed document on a pixel to pixel basis, based on the shading correction data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic cross-sectional side view illustrating an outline of the image reading apparatus;

DESCRIPTION OF THE EMBODIMENTS

Figure 1:
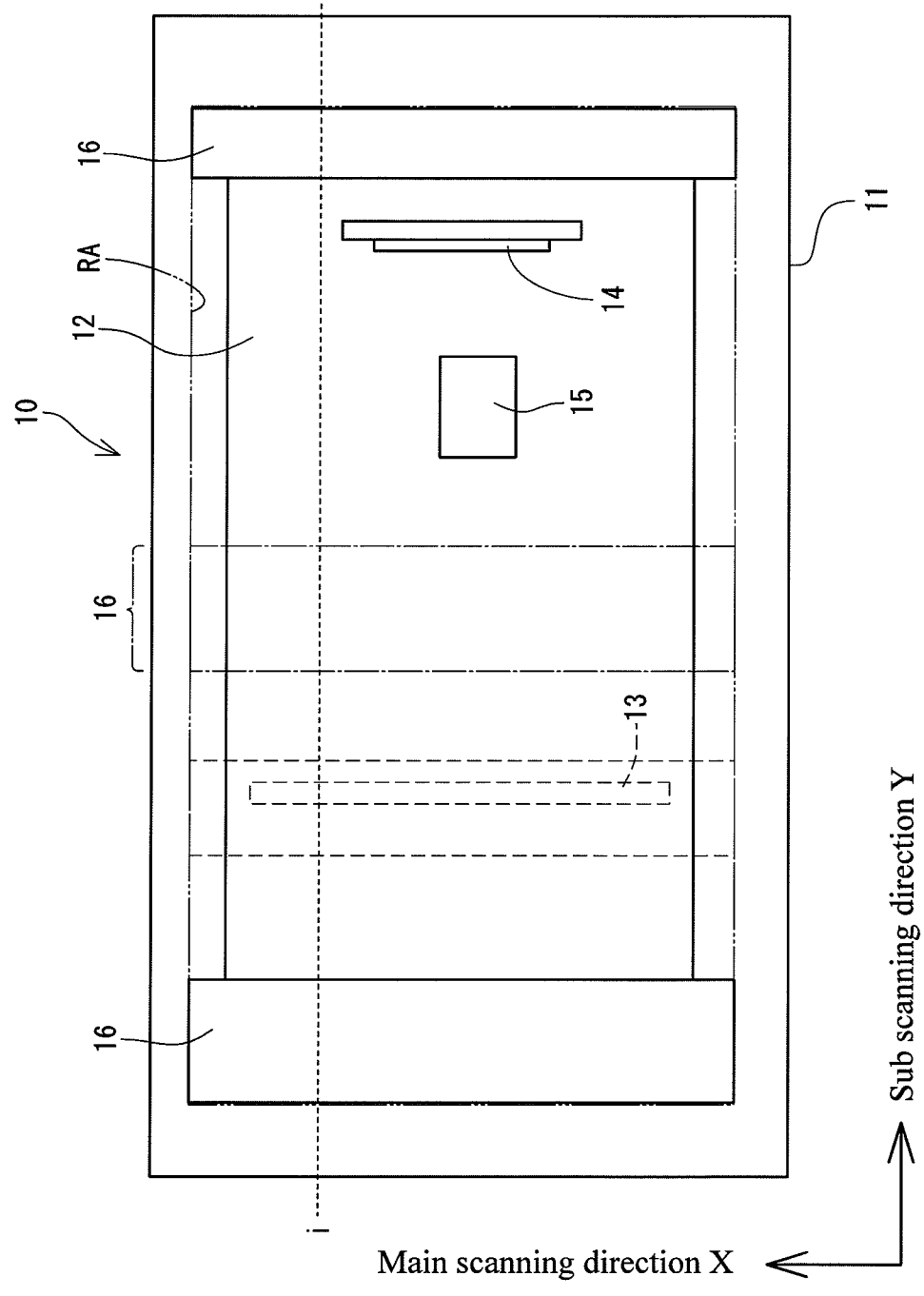
FIG. 1 is a schematic plan view illustrating an outline of an image reading apparatus.

The embodiments will now be described with reference to the accompanying drawings, wherein like reference numerals designate corresponding or identical elements throughout the various drawings.

1. An Outline of an Image Reading Apparatus

First, by referring to FIG. 1 to FIG. 3 and other drawings, an outline of an image reading apparatus 10 will be described below. As shown in FIG. 1, the image reading apparatus 10 includes a document table 11, a light source device 13, an image sensor 14, an imaging lens 15, and white reference plates 16. The document table 11 has a platen glass 12 on the top surface side of the image reading apparatus 10. The light source device 13 irradiates a printed document P placed on the platen glass 12 with a light. The image sensor 14 is a reader that photoelectrically converts a light reflected from the printed document P into image data. The imaging lens 15 provides an image of the reflected light on the image sensor 14. White reference plates 16 are density reference members that reflect a light from the light source device 13 at shading correction. The light source device 13, the image sensor 14, and the imaging lens 15 are disposed inside the document table 11. The document table 11 includes, on its top surface side, a document pressing portion 17 openably and closably disposed, which presses the printed document P on the platen glass 12 from above. The document pressing portion 17 covers the printed document P so as to bring the printed document P in close contact with the platen glass 12.

Figure 3A:
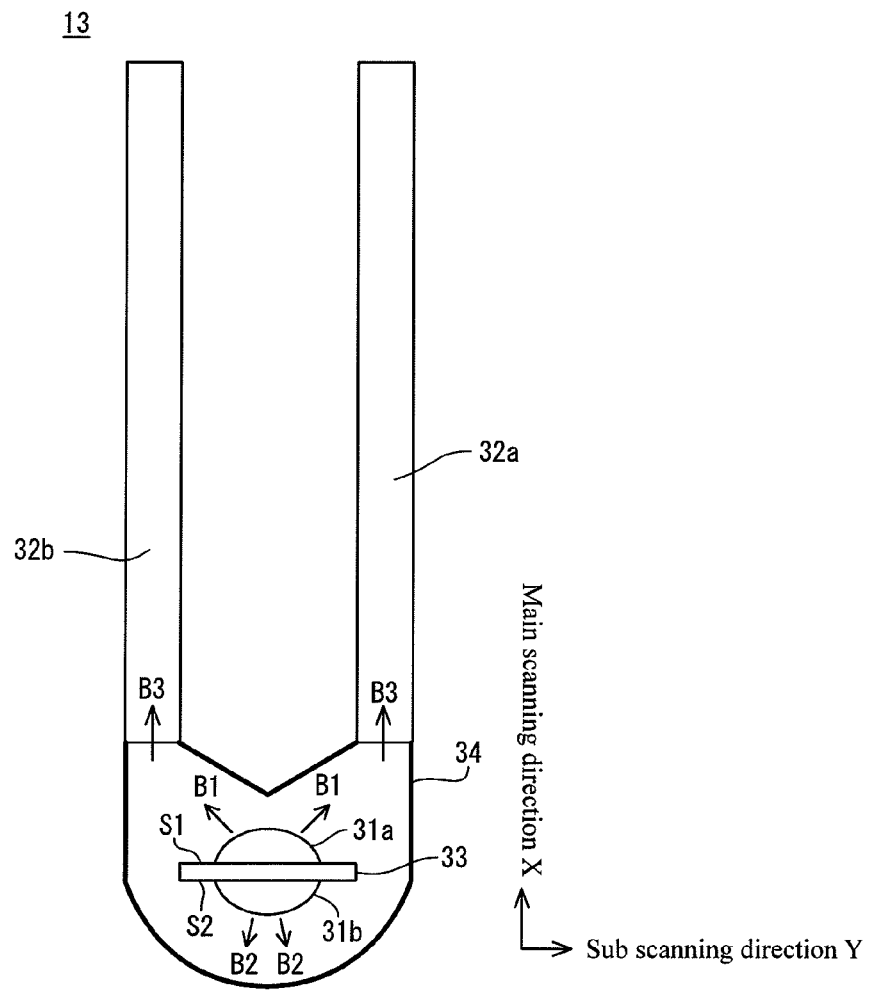
FIG. 3A is an explanatory plan view illustrating a structure of a light source device.
Figure 3B:
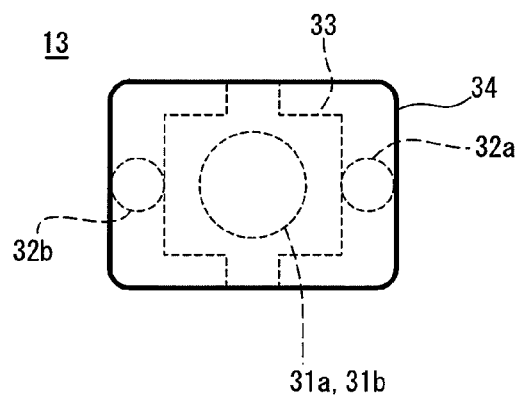
FIG. 3B is an explanatory side view illustrating the structure of a light source device.

As specifically illustrated in FIGS. 3A and 3B, the light source device 13 includes LEDs 31a and 31b (light-emitting diode), light guiding bodies 32a and 32b, a substrate 33, and a casing 34. The light source device 13 is configured to irradiate the printed document P on the platen glass 12 with white lights B3a and B3b having an identical component and amount from respective two directions. The LEDs 31a and 31b are semiconductor devices, which radiate white lights B1 and B2. The substrate 33 has principal surfaces S1 and S2 and includes a built-in LED driver 44 for the LEDs 31a and 31b (see FIG. 4 for the driving circuit). The LED driver 44 controls the LEDs 31a and 31b to turn on and off based on a driving signal from a controller 20 described below (see FIG. 4). The substrate 33 is disposed in the casing 34 in a perpendicular posture to main scanning direction X. The LED 31a is mounted on the principal surface S1 side while the LED 31b is mounted on the principal surface S2 side.

The casing 34 covers the LEDs 31a and 31b and a peripheral area of the substrate 33, and includes a mirrored inner circumferential surface inside the casing 34. The casing 34 reflects the white lights B1 and B2, which are radiated by the LEDs 31a and 31b, at the mirrored inner circumferential surface, thus generating a resultant light B3. The resultant light B3 is a mixture of the white lights B1 and B2 in a fixed proportion.

The light guiding bodies 32a and 32b are transparent resin materials that have a long cylindrical shape in main scanning direction X. Each of the light guiding bodies 32a and 32b has one end side in a longer side direction, which is installed on the casing 34. The resultant light B3 mixed in the casing 34 enters the one end side in the longer side direction of the respective light guiding bodies 32a and 32b. The resultant light B3 is irradiated to the printed document P by prisms formed on respective surfaces of the light guiding bodies 32a and 32b. For ease of explanation, the resultant light B3 irradiated from the light guiding body 32a is occasionally designated with a reference numeral B3a while the resultant light B3 irradiated from the light guiding body 32b is occasionally designated with a reference numeral B3b. The resultant light B3 diffusely reflects at the lower surface of the printed document P (the surface to be read in close contact with the platen glass 12).

Inside the document table 11, a pair of sliders 41 and 42 is disposed. The pair of sliders 41 and 42 is movable back and forth in sub scanning direction Y perpendicular to main scanning direction X by an optical system driving mechanism 43 including an electric motor and other members (see FIG. 4). The back and forth movement of the slider 41 moves a region irradiated by the resultant light B3 back and forth in sub scanning direction Y. The pair of sliders 41 and 42 includes returning mirrors 35 to 37. The resultant light B3 emitted from the light guiding bodies 32a and 32b is reflected at the printed document P. A reflected light B4, which is irradiated from the light guiding bodies 32a and 32b and reflected at the printed document P, is sequentially reflected at the respective returning mirrors 35 to 37 and then enters the imaging lens 15. The first slider 41 includes the above-described light source device 13 and returning mirror 35 built inside the first slider 41. The second slider 42 includes the returning mirrors 36 and 37 built inside the second slider 42. When reading the printed document P, the first slider 41 moves in sub scanning direction Y at a speed of V while the second slider 42 moves in sub scanning direction Y at a speed of V/2 (see FIG. 2). Accordingly, a path length of the reflected light B4 between the reading surface of the printed document P and the image sensor 14 is always constant during reading.

The imaging lens 15 provides an optical image, which is obtained from the reflected light B4 through the returning mirrors 35 to 37, on the image sensor 14. The image sensor 14 is an element that receives the light B4 reflected at the printed document P. Specifically, the image sensor 14 has an imaging area, which is a one-dimensional area extending in main scanning direction X. The image sensor 14 employs a line sensor such as a CCD and a CMOS, which scans the optical image provided by the imaging lens 15 and reads the image of the printed document P.

The white reference plates 16 are strip-shaped members that have a rectangular shape with one side extending in the main scanning direction. The white reference plates 16 are separately disposed in at least three positions in sub scanning direction Y in readable area RA of the image sensor 14. In this case, the platen glass 12 includes, in its upstream and downstream in sub scanning direction Y, the first and third white reference plates 16. A middle part (a region enclosed by a dashed-dotted line in FIG. 1) in the sub scanning direction Y on the lower surface side of the document pressing portion 17 is also used as the second white reference plate 16. Therefore, at least one of the white reference plates 16 is located above the platen glass 12. The white reference plates 16 are configured to have a longer length than the maximum width of readable area RA in main scanning direction X. Readable area RA of the image sensor 14 has a peripheral area outside the platen glass 12 area as a document placing area. The size and installation position of the white reference plates 16 are not limited to the exemplary plates, and any size and installation position are possible insofar as the white reference plates 16 have a rectangular shape.

The image reading apparatus 10 includes an operating unit 18 (see FIG. 4), in which a user inputs various commands. The operating unit 18 includes, for example, various operating buttons (not shown) such as number buttons, function buttons for switching various settings, a start button for sending a command to start execution and the like. The operating unit 18 is configured to receive a shading correction command by user input operation. The operating unit 18 outputs the operation signal by user input operation to the controller 20 described below.

The image reading apparatus 10 includes, for example, a displaying portion 19 (see FIG. 4) such as an LCD display, a CRT display, and an EL display. The displaying portion 19 displays, in accordance with commands from the controller 20 described below, various operating screens, image status, execution status of various functions, various processing results and the like.

The displaying portion 19 may include, on its screen, a pressure sensitive (resistive pressure sensitive) touchscreen, which locates transparent electrodes in a grid pattern, thus integrating the operating unit 18 and the displaying portion 19 together. In this case, the touchscreen detects an XY-coordinate point pressed by a finger, a stylus pen or the like as a voltage value, and then outputs the detected position signal as an operation signal to the controller 20.

When the image reading apparatus 10 thus configured reads the printed document P, the resultant lights B3a and B3b guided by the light guiding bodies 32a and 32b are irradiated to the printed document P, and the reflected light B4 reflected from the printed document P is then sequentially reflected at the returning mirrors 35 to 37. The reflected light B4 reflected at the last returning mirror 37 enters the imaging lens 15, thus providing an image on the image sensor 14 through the imaging lens 15. The image sensor 14 executes photoelectric conversion corresponding to incident light intensity on a pixel to pixel basis, and then generates an image signal (an RGB signal) corresponding to the image of the printed document P, thus outputting the image signal to the controller 20.

2. A Control Structure of the Image Reading Apparatus

Figure 4:
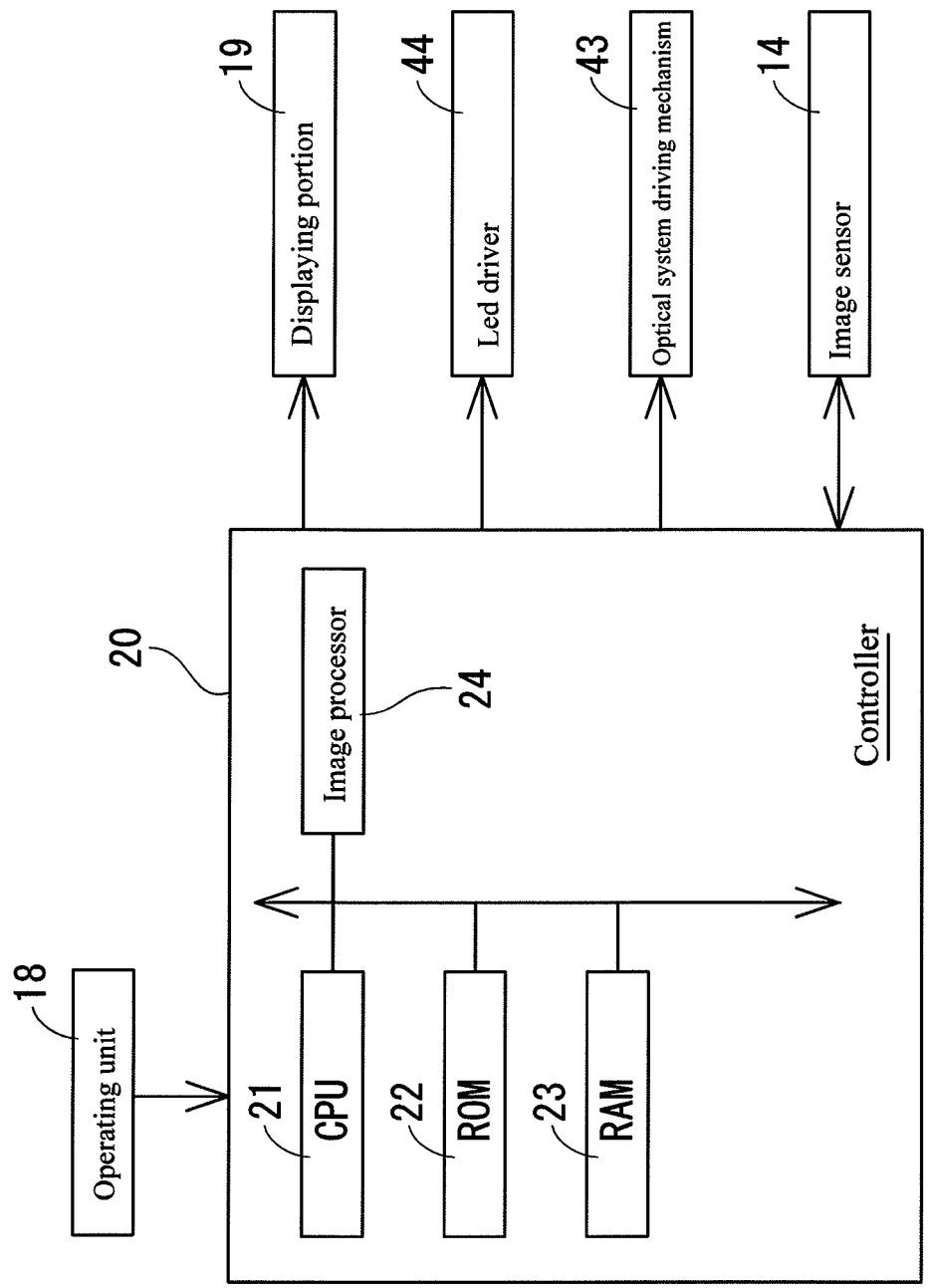
FIG. 4 is a functional block diagram illustrating a control structure of the image reading apparatus.

Next, by referring to FIG. 4, a control structure of the image reading apparatus 10 will be described. As shown in FIG. 4, the image reading apparatus 10 includes the controller 20, which includes a CPU 21, a ROM 22, a RAM 23, an image processor 24 and the like. The ROM 22 is a memory that stores an initial program, which executes various initial settings, hardware inspection, required program loading and the like, a system program, various application programs to be executed on the system program, and data related to process of respective programs and the like. The RAM 23 functions as a working memory (a storing means), which temporarily stores various data (for example, shading correction data described below) such as input-output data and parameters when the CPU 21 runs the program.

The CPU 21 runs arithmetic operations and controls in accordance with various programs stored in the ROM 22. The CPU 21 reads out various programs stored in the ROM 22 and then extracts the various programs in a work area in the RAM 23. The CPU 21 centrally controls each portions of the image reading apparatus 10 to execute in accordance with the extracted programs.

The image processor 24 functions as a shading corrector that corrects variations in sensitivity and brightness of the image sensor 14 and a light amount variation of the LEDs 31a and 31b of the image data, which is read by the image sensor 14, on a pixel to pixel basis based on shading correction data described below. The shading correction data and white distribution data (described in detail below), which are obtained at the shading correction, are updated as needed and then stored in the RAM 23 or the like. The image processor 24 performs image processing such as luminance and density transformation, region determination of characters, halftone dot or the like, main scanning magnification and filtering, density γ conversion, and error diffusion of the image data on which the shading correction is performed.

3. Description of Shading Correction Control

Figure 6:
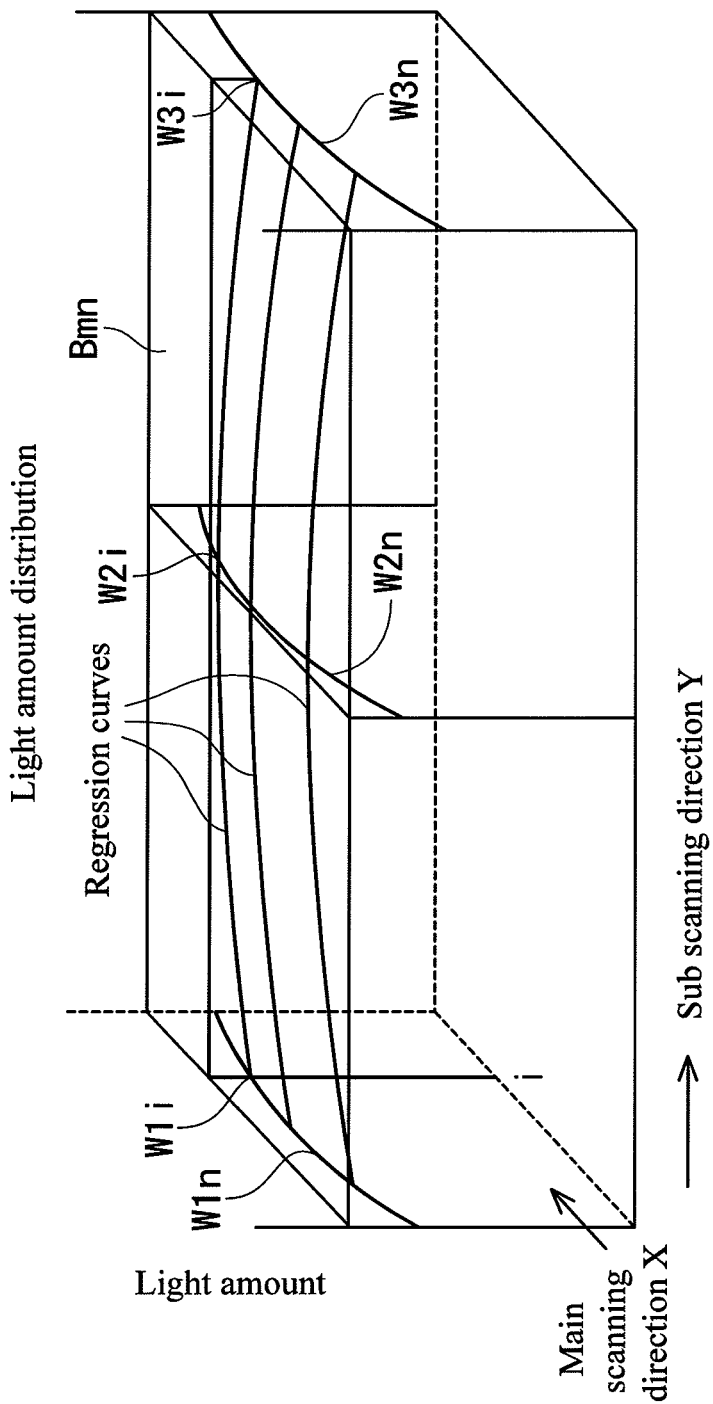
FIG. 6 is a 3D graph of a shading correction data.
Figure 7:
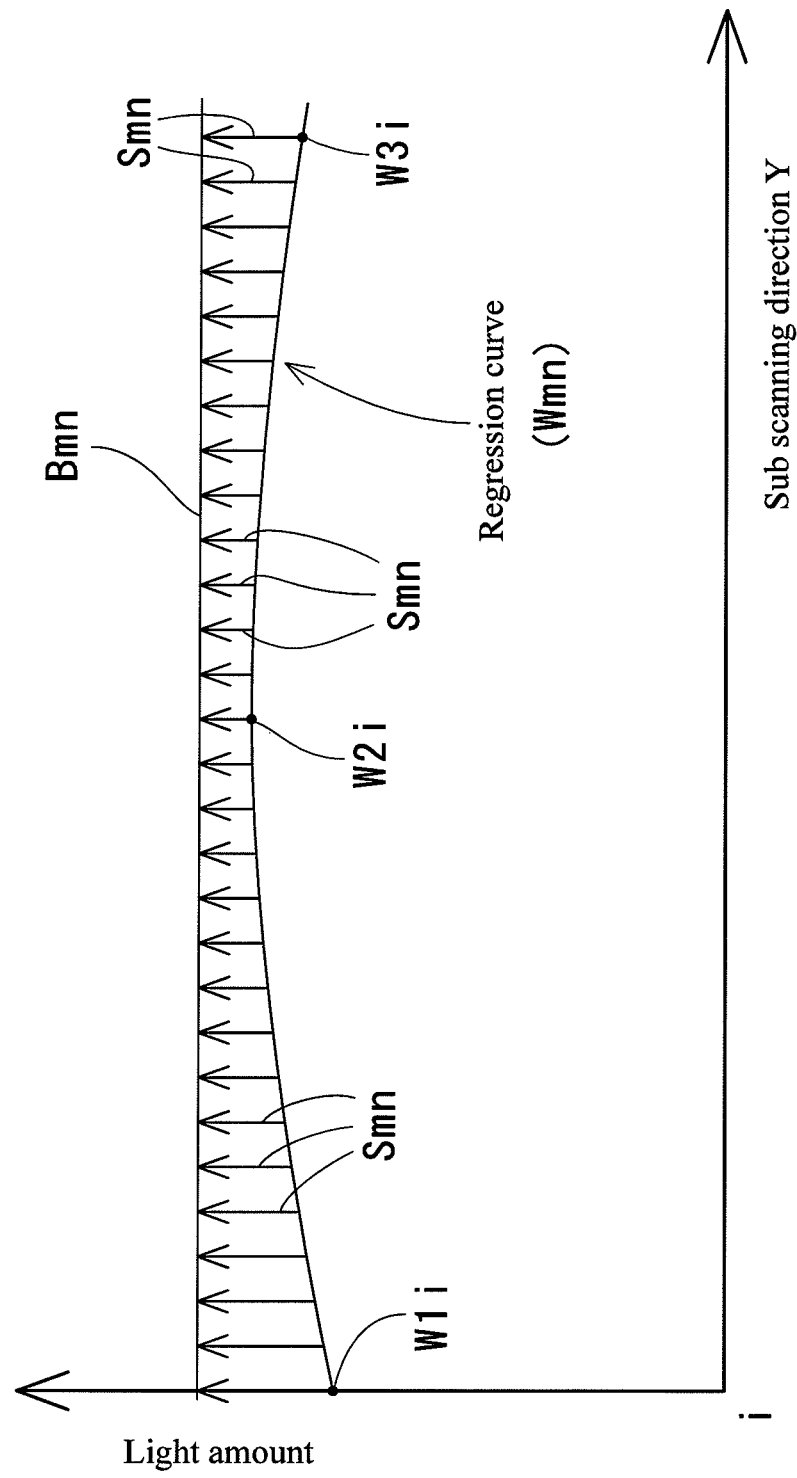
FIG. 7 is a graph illustrating a regression curve of the i-th distributed values in the main scanning direction.

Next, by referring to FIG. 5 to FIG. 7, a shading correction control by the controller 20 will be described. The controller 20 is configured to calculate shading correction data Smn using white distribution data W1n to W3n (see FIG. 6) obtained by reading the respective white reference plates 16 along main scanning direction X with the image sensor 14 and execute the shading correction control. The shading correction control corrects image data of the printed document P on a pixel to pixel basis, based on the shading correction data Smn. The white distribution data W1n to W3n constitute density distribution data.

Figure 5:
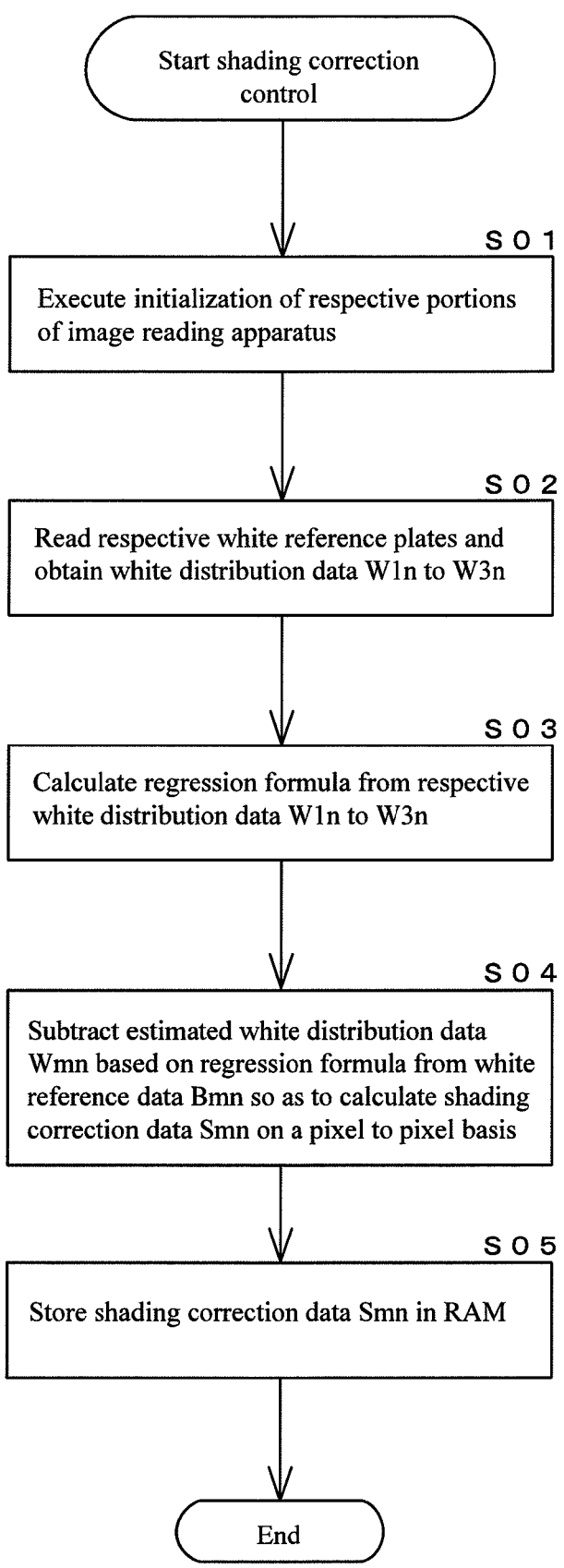
FIG. 5 is a flowchart of a shading correction control.

FIG. 5 is a flowchart of a process of the shading correction control. In this example of the shading correction control, when an electric power supply is turned on and supplies electric power to the image reading apparatus 10, or the controller 20 receives read command of the printed document P, the controller 20 starts control and executes initialization of respective portions of the image reading apparatus 10 (S01). Subsequently, the controller 20 turns on the light source device 13, moves the respective sliders 41 and 42 to respective positions to read the white reference plates 16, and reads the white reference plates 16 at every pixel in main scanning direction X, thus obtaining the white distribution data W1n to W3n corresponding to the respective white reference plates 16 (S02). As shown in FIG. 6, the respective white distribution data W1n to W3n is represented as a convex upward curve where the light decreases in amount (light amount variation) as approaching both end sides of main scanning direction X.

Subsequently, a regression formula is obtained from distributed values of the respective white distribution data W1n to W3n in the same line along sub scanning direction Y (S03). The regression formulas are obtained for every pixel along main scanning direction X. In the first example, the distributed values in the same line along sub scanning direction Y are available at the three positions. FIG. 7 illustrates a regression curve of the i-th distributed values W1i to W3i of the respective white distribution data W1n to W3n in main scanning direction X. The regression formula, which is obtained from these distributed values W1i to W3i, is represented by a convex upward curve with the high abundance close to the center. That is, the light appears to decrease in amount as approaching the both end sides of sub scanning direction Y. This appears a mountain-shaped light amount distribution in readable area RA. The mountain-shaped light amount distribution has the apex at the proximity of the center of main scanning direction X and sub scanning direction Y.

Next, subtracting estimated white distribution data Wmn at each pixel position based on the preliminary obtained respective regression formula from white reference data Bmn, which is preliminary determined, calculates shading correction data Smn on a pixel to pixel basis (S04). The white reference data Bmn is represented by the horizontal line in FIG. 7 and the upper horizontal surface in FIG. 6. Shading correction data Smn of every pixel of readable area RA is then stored in the RAM 23 (S05). When reading the printed document P, shading correction data Smn is reflected in the image data read by the image sensor 14 on a pixel to pixel basis. This performs image processing for the image processor 24 to achieve uniform brightness.

The above-described control uses the white distribution data W1n to W3n obtained by reading the respective white reference plates 16 in main scanning direction X with the image sensor 14 (more specifically, obtained by reading the strip-shaped density reference members extending along the main scanning direction at the three positions with the image sensor 14) so as to calculate shading correction data Smn. The control corrects the image data of the printed document P based on this shading correction data Smn on a pixel to pixel basis. This allows to obtain the image data without density variation (light amount variation) along not only main scanning direction X but also sub scanning direction Y. Accordingly, even with the highly directional light source device 13 such as the LEDs 31a and 31b (regardless of the kind of the light source device 13), this allows to generate high quality image data, thus ensuring the satisfactory image reading.

The image reading apparatus 10 includes the operating unit 18 that receives command of the shading correction by user input operation. This allows the user to operate the operating unit 18 so as to execute the shading correction as necessary whenever the user desires.

The white reference plates 16 as the density reference member may be configured to cover the whole surface of readable area RA. For example, the whole lower surface side of the document pressing portion 17 may function as the white reference plates 16. In this case, it is possible to obtain the white distribution data Wmn of the whole pixels of readable area RA. This ensures improved correction accuracy of each pixel with shading correction data Smn. The light source device 13 is not limited to a combination of the LEDs 31a and 31b and the light guiding bodies 32a and 32b, but may include an array-shaped configuration of a plurality of LEDs along main scanning direction X. The light source device 13 may include a plurality of this kind of array-shaped configurations of LEDs. When at least one of the white reference plates 16 may be positioned above the platen glass 12, the at least one white reference plate 16 may be positioned within readable area RA and outside the document placing area. This allows to regularly read the at least one white reference plate 16 so as to automatically execute the shading correction even if, for example, the light decreases in amount due to deterioration or the like of the LEDs 31a and 31b.

4. Other Configurations of the Shading Correction Control

Figure 8:
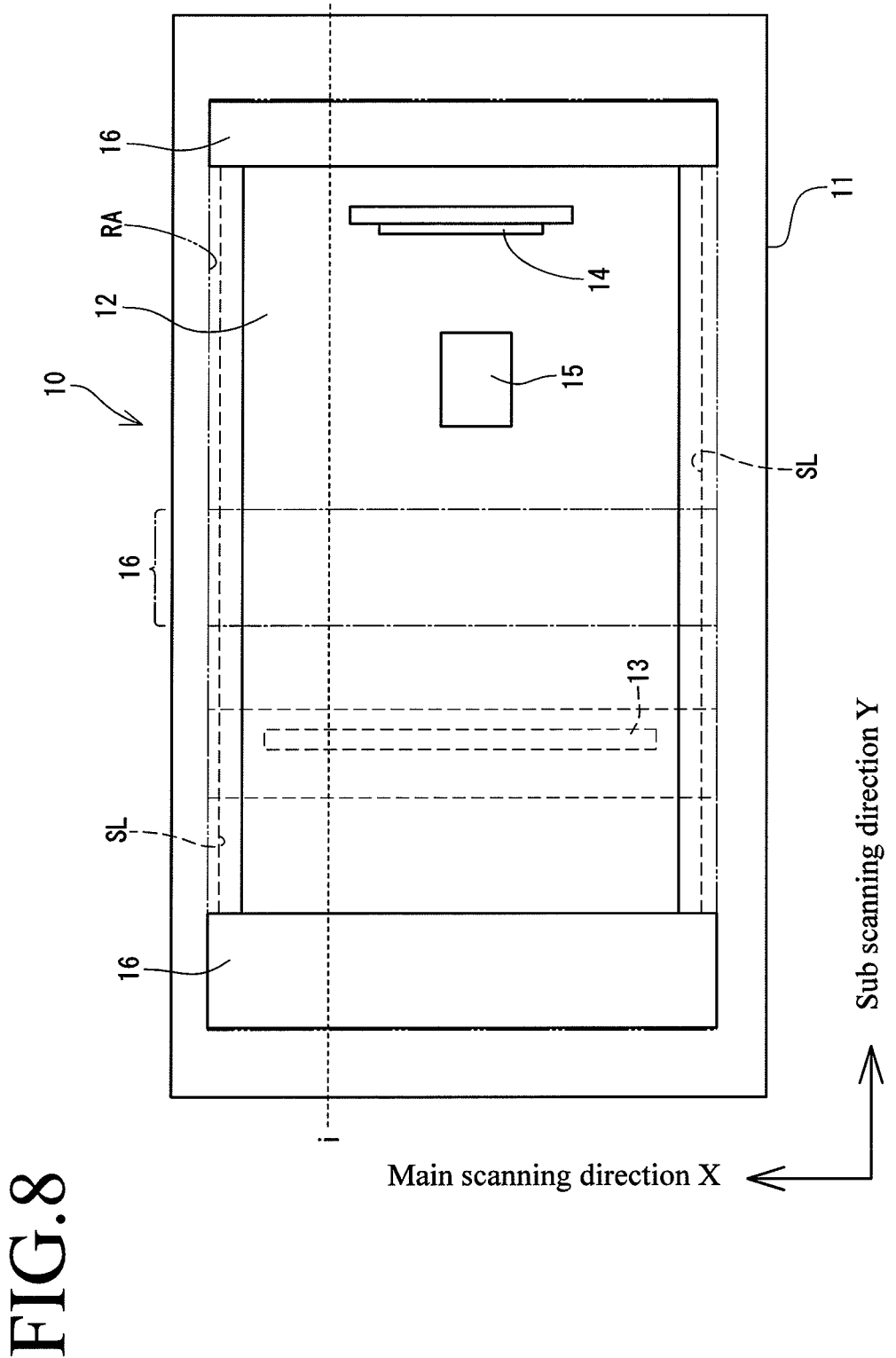
FIG. 8 is a schematic plan view illustrating a structure to detect reading deviation.

FIG. 8 is a schematic plan view of the image reading apparatus 10 corresponding to a shading correction control according to another example. This example shown in FIG. 8 includes a pair of reference lines SL, which is readable by the image sensor 14, extending along sub scanning direction Y within readable area RA and outside the document placing area. This example is otherwise similar to the above-described embodiment. The image sensor 14, which reads the reference lines SL, also functions as a misalignment detector. In this case, when the image sensor 14 reads the respective white reference plates 16 along main scanning direction X, the image sensor 14 also reads the respective reference lines SL. This allows the controller 20 to determine existence or non-existence of a misalignment of reading position in main scanning direction X of the respective sliders 41 and 42, which move in sub scanning direction Y, from reading results of these reference lines SL. The misalignment of reading position is reflected into the setting of shading correction data Smn. This control appropriately executes the shading correction even in the case where, for example, the respective sliders 41 and 42 move in sub scanning direction Y vibrating. This ensures a satisfactory image reading.

5. Others

It will be appreciated that the present invention will not be limited to the embodiment described above, but various modifications are possible without departing from the technical scope of the present invention. Configurations of respective portions will not be limited to the embodiment shown in drawings, but various modifications are possible without departing from the technical scope of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image reading apparatus comprising:
   a light source device configured to move an irradiated region in a sub scanning direction and irradiate a printed document placed on a platen glass of a document table with a light;
   a reader configured to convert a light reflected from the printed document into the image data so as to read;
   a plurality of strip-shaped density reference members that extend along main scanning direction, the plurality of strip-shaped density reference members being separately disposed in at least three positions comprising an upstream end portion, a center portion, and a downstream end portion in the moving direction of the sub scanning direction within a readable area of the reader; and
   a shading corrector configured to calculate shading correction data using density distribution data obtained by reading the plurality of strip-shaped density reference members with the reader and correct image data of the printed document on a pixel to pixel basis, based on the shading correction data.

2. The image reading apparatus according to claim 1, wherein the density reference member arranged on the center portion among the at least three positions is disposed above the platen glass.

3. The image reading apparatus according to claim 2, wherein the density reference member arranged on the center portion is disposed on a lower surface side of a document pressing portion, the document pressing portion being openably and closably configured to press the printed document on the platen glass from above the platen glass.

4. The image forming apparatus according to claim 1, wherein shading correction data of a region without the strip-shaped density reference member is calculated by a regression formula using the density distribution data obtained by reading the plurality of strip-shaped density reference members.

5. The image forming apparatus according to claim 1, further comprising an operating unit configured to receive command of shading correction by user input operation.

6. The image reading apparatus according to claim 1, further comprising a misalignment detector configured to detect misalignment of a reading position of the reader, wherein the shading corrector is configured to calculate the shading correction data, the misalignment of the reading position being adjusted in the shading correction data based on a detected result of the misalignment detector.

7. The image reading apparatus according to claim 1, wherein the light source device comprises a light-emitting diode.

8. The image reading apparatus according to claim 1, wherein the light source device comprises a combination of a light-emitting diode and a light guiding body.

9. The image reading apparatus according to claim 1, further comprising a reference line, which is readable by the reader, extending along sub scanning direction, wherein the shading corrector is configured to calculate the shading correction data, the misalignment of the reading position in main scanning direction being adjusted in the shading correction data based on a detected result of the reference line.

* * * * *